W. G. BERRY.
AUTOMATIC MULTIPLE SPINDLE LATHE.
APPLICATION FILED DEC. 6, 1918.
1,396,807.
Patented Nov. 15, 1921.
4 SHEETS—SHEET 1.
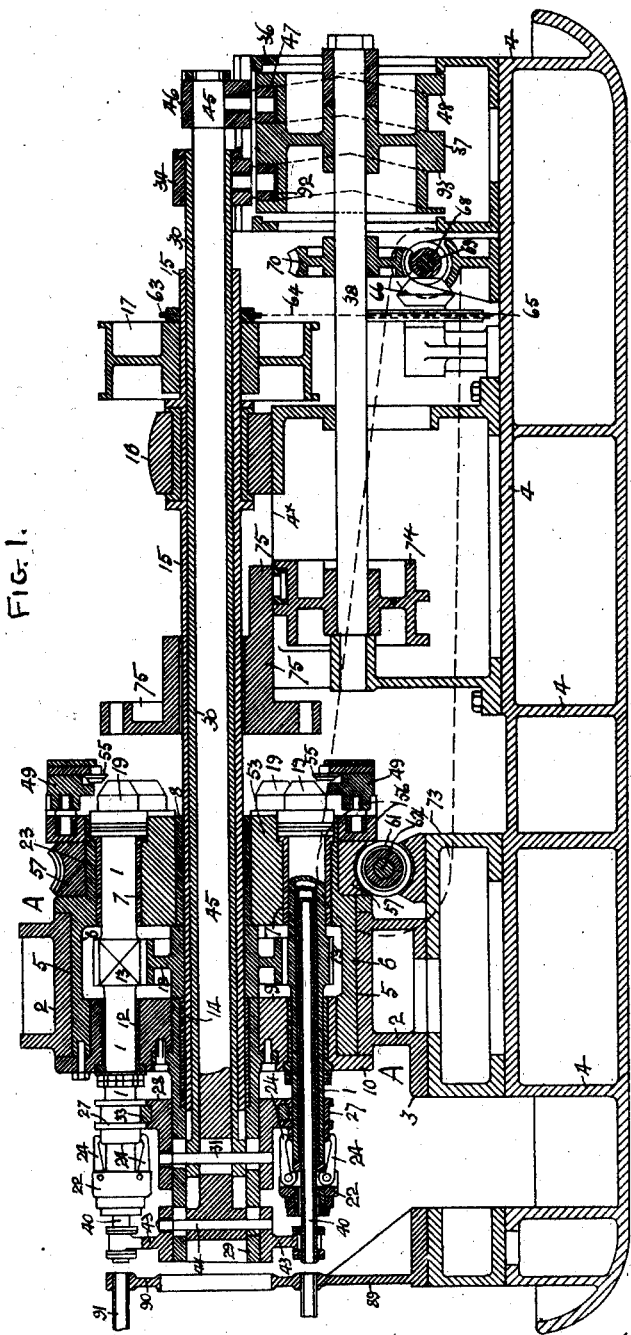
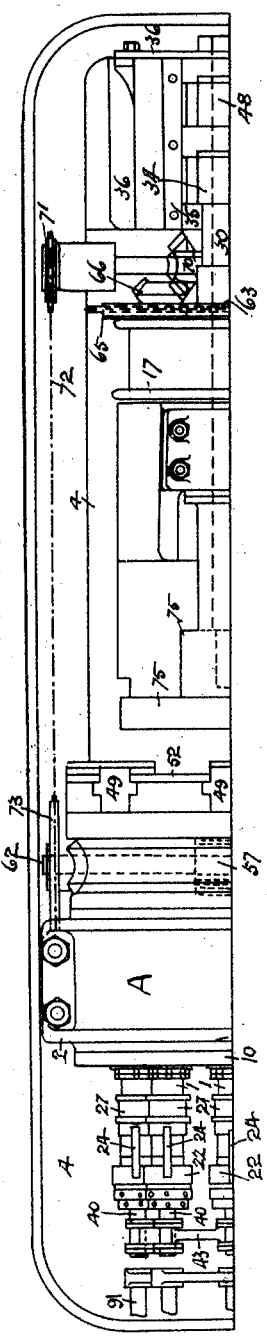
INVENTOR:
William George Berry
By Wm Wallace White ATTY.

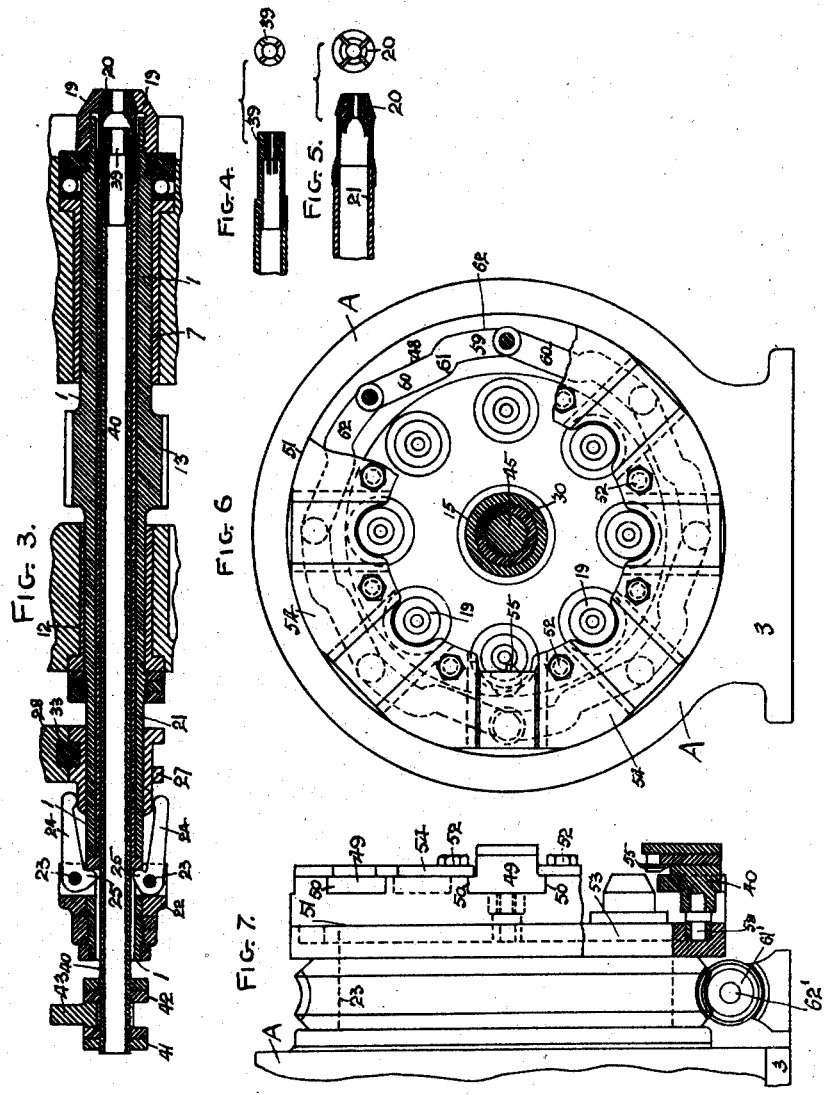

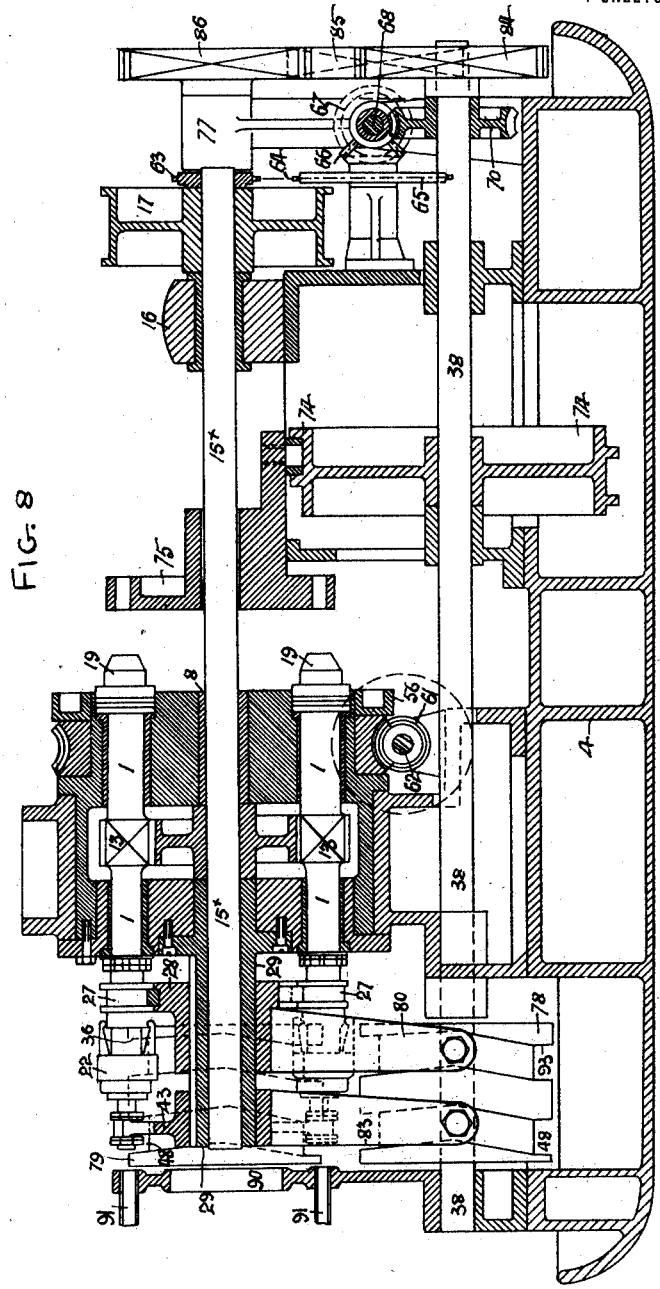

W. G. BERRY.
AUTOMATIC MULTIPLE SPINDLE LATHE.
APPLICATION FILED DEC. 6, 1918.

1,396,807.

Patented Nov. 15, 1921.
4 SHEETS—SHEET 4.

INVENTOR:
William George Berry
by Wm Wallace White
ATTY.

UNITED STATES PATENT OFFICE.

WILLIAM GEORGE BERRY, OF LONDON, ENGLAND.

AUTOMATIC MULTIPLE-SPINDLE LATHE.

1,396,807. Specification of Letters Patent. Patented Nov. 15, 1921.

Application filed December 6, 1918. Serial No. 265,493.

*To all whom it may concern:*

Be it known that I, WILLIAM GEORGE BERRY, a subject of His Majesty the King of Great Britain and Ireland, residing at 35 Pepys road, Cottenham Park, Wimbledon, London, S. W. 19, England, have invented new and useful Improvements in Automatic Multiple-Spindle Lathes, of which the following is a specification.

This invention has reference to automatic multiple spindle lathes which are used for turning or forming and cutting off nut blanks, collars and innumerable other articles from the ends of long rods or tubes which are automatically fed through hollow spindles of the lathe.

My improvements enable a lathe for said purposes to be constructed which while being simple in construction easy to manipulate, requiring very little attention and not liable to undue wear, enables a very large output of said articles to be attained.

According to this invention any convenient number of hollow lathe spindles are arranged around the center of a stationary head stock said spindles being adapted to rotate about their axes in stationary bearings but not to rotate about the center of the head stock. The long rods or tubes from which the articles are to be formed are supported at the back of the head stock and by means of automatic mechanism they are intermittently fed for the required distance through the chuck like nose ends of the spindles and are automatically gripped therein and the protruding end parts of the rods or tubes are then if necessary drilled or turned or otherwise acted on by a corresponding number of tools carried by a sliding head in front of the spindles and the required portions forming blanks or other articles are ultimately cut off from the rods by cutting off tools mounted on slides on a part carried by or at the front of the head stock and actuated by a revolving cam. Or when said blanks or parts are merely required to be cut off from the rods or tubes without being turned or drilled or otherwise operated on except by the cutting off tools, then the said tools carried by the sliding head in front of the spindles may be dispensed with. Mechanism is provided for automatically effecting the various operations of the machine so that at each complete cycle of operations a number of articles are formed and fall away corresponding with the number of hollow lathe spindles with which the machine is provided.

I will describe my invention by referring to the accompanying drawings of which—

Figure 1 is a longitudinal sectional elevation of an automatic multiple spindle lathe constructed in accordance with this invention;

Fig. 2 is a half plan of the same;

Fig. 3 is a section plan of one of the hollow lathe spindles and its accessories;

Fig. 4 is a longitudinal sectional elevation and end view of one of the split gripping parts and inner tubes of the lathe spindles;

Fig. 5 is a sectional elevation of one of the coned gripping chucks of the hollow lathe spindles;

Fig. 6 is a part sectional front elevation of the head stock of the said machine;

Fig. 7 is a part sectional side elevation of the same;

Fig. 8 is a longitudinal sectional elevation of a modified arrangement of the said multiple spindle lathe;

Figure 9:
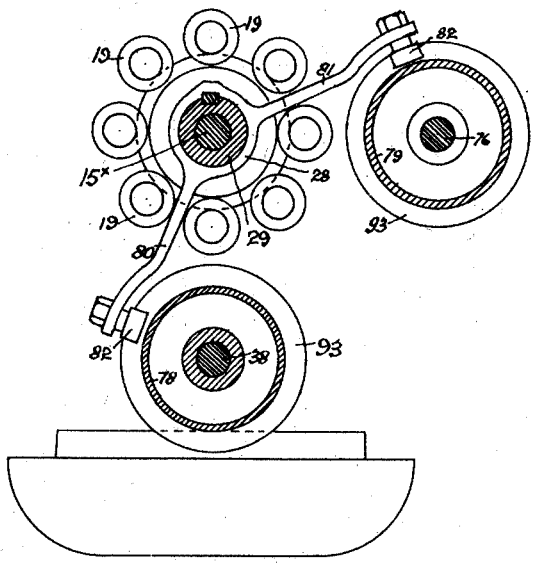
Fig. 9 is a cross sectional elevation of parts of the same taken on line X X of Fig. 8, and looking toward the left hand of said figures.

I will describe my invention in connection with operating on rods but the same machine will equally well operate on tubes.

The hollow lathe spindles 1 (say for instance eight in number as shown, although I do not confine myself to any particular number) are arranged at equal distances apart around the center of the stationary head stock A and revolve in stationary bearings therein. For convenience of manufacture the head stock A comprises a body part 2 made with a suitable base 3 fixed to the bed plate 4 of the machine, this body part 2 being bored at 5 and there fitted with a cylindrical part 6, one end of which is bored and furnished with bearings 7 for the lathe spindles 1 and a central bushing 8 for the outer tubular sleeve of the main spindle. Fitted in the open end of this cylindrical part 6 there is a disk part 9 formed with a flange 10 which by screws 11 is fixed to the end of the cylinder 6, and this disk part 9 is furnished with the eight bearings 12 for the lathe spindles 1 leaving a space between these bearings and the bearings 7 for the pinions 13 on the lathe spindles 1. The disk part 9 also has a central bearing 14 for the outer sleeve of the main spindle.

This main spindle 15 is tubular and passes through the center of the head-stock A and is carried forward for a convenient distance in front of the head-stock A and through a stationary bearing 16 fixed on a stand 4* on the bed 4 of the machine and the front end of this driving spindle 15 has fixed on it a driving pulley 17 which is the main driving pulley of the machine. Within the head stock A there is fixed on this hollow driving shaft 12 a spur wheel 18 which gears with the spur pinions 13 which are formed on the lathe spindles 1 and thus the lathe spindles are driven. The gripping and feeding forward of the rods from which the articles are to be turned is effected by the following mechanism:—Each of the hollow lathe spindles 1 is at its front end furnished with a hollow coned nose piece 19 and fitting in each of these there is a coned gripping chuck 20 (shown separately in Fig. 5) which is fixed on the end of a tube 21 which fits in the hollow lathe spindle 1 and is continued to the back of the same. I will call this tube 21 the outer tube. Mounted on the back end of each of the hollow lathe spindles 1 there is a collar 22 having jointed to it at 23 a pair of forwardly projecting operating levers 24 made with heels 25 which project through slots 26 in the collar 22 and spindle 1 and act on the end of the outer tube 21, the longer arms of these levers 24 bearing on sliding collars 27 slidably mounted on the outside of the lathe spindles 1. Longitudinal movements along the lathe spindles 1 are imparted to these collars 27 by means of a circular block 28 which is arranged to slide on the outside of a sleeve 29 which is fixed to and projects through the back end of the disk part 9 of the head stock. This sliding circular block 28 is actuated by a tubular push bar 30 which is mounted inside the hollow driving spindle 15 and is connected to the circular block 28 by the cross pin 31 working through slots in the sleeve 29. The connection of each of the sliding collars 27 to the sliding circular block 28 is preferably effected by a ring part 33 which engages in an annular groove in the periphery of the collar 27 and also engages in an annular groove in the periphery of the circular block 28. The hollow push bar 30 projects through the hollow main spindle 15 at the front end of the same and fixed on that end there is a block 34 adapted to slide in longitudinal guides 35 on a bracket 36 fixed on the front end of the bed 4 of the machine. The said sliding block 34 is furnished underneath with a roller 92 engaging with a groove 93 of a cam 37 mounted on a cam shaft 38 arranged longitudinally of the machine underneath the main driving spindle 15 and parallel therewith, this cam groove 93 being shaped so as to impart the proper longitudinal movements to the push bar 30 so that the movements of the latter are imparted through the cross pin 31 and sliding block 28 and ring 33 to the sliding collars 27 on the hollow lathe spindles, which sliding collars when moved backwardly open apart the forward ends of the levers 24 so that the inner short ends or heels 25 of the levers act upon said outer tubes 21 in the lathe spindles 1 and push forward the coned gripping chucks 20 in the coned nose pieces 19 of the spindles and grip the rods and when the coned gripping chucks 20 are by the said cam groove 36 moved in the opposite direction the rods are released. The forward feeding movement of the rods is effected by each lathe spindle having a split gripping collar 39 or other gripping part arranged within the hollow gripping chuck 20 and fixed on the end of a tube 40 which I call the inner tube and which is carried through the back of the outer tube 21 of the lathe spindle, this inner tube 40 being made of suitable diameter for the rod which is being operated on to pass through and also to pass into the gripping collar 20. These inner tubes 40 have collars 41, 42 preferably adjustably screwed thereon or are otherwise arranged at the back ends to engage with a somewhat circular plate 43 which is mounted to slide on the sleeve 29 and is connected as by a cross pin to a central push bar 45 which passes through the hollow push bar 30 and through the front end of the same where it is fixed on to a sliding block 46 adapted to slide along the slides 35 of the longitudinal slide bracket 36 above referred to this sliding block 46 having fixed underneath it a roller 47 engaging with a cam groove 48 in the cam 37 so as to impart the proper longitudinal movements at the proper times to the push rod 45 and the inner tubes 40 of the lathe spindles, the cam groove 48 being so shaped that while the rods are being gripped by the chucks 20 in the nose pieces 19 of the spindles the feed gripping tubes 40 with their gripping ends 39 move backwardly the required distance to take a fresh grip on the rods and then move forward again with the rods when the rods have been released by the gripping chucks 20.

Immediately in front of the nose piece 19 of the lathe spindles, cutting off tools are provided which are carried by slides 49 mounted in radial guides 50 on a disk like non-rotating plate or part 51 which is bolted or otherwise fixed as by the screws 52 to the front part 53 of the head stock A. The slides 49 are retained in the radial grooves 50 by the front plates 54 fixed by the aforesaid screws or by other suitable means. The slides 49 each of which carries the cutting off tool 55 of any suitable construction adapted to cut off the required end portion of the rod which has been operated upon and these slides 49 are moved to and fro along their guides by the revolving cam ring 56 surrounding the lathe spindles and adapted to revolve on the projecting circular front part 53 of the head stock. Said cam ring is fixed to the face of the worm wheel 57 which is mounted to revolve on the said projecting front part 53 of the head stock surrounding the lathe spindles 1. Each of the slides 49 has fixed on its back face a pin carrying a roller 58 engaging in the groove 59 of the cam ring, this groove being shaped in sections corresponding with the lathe spindles 1, in this case eight in number, each section having an inclined part 60 shaped so as to move the slide 49 comparatively slowly inwardly as the cutter 55 is operating on the rod and this inclined part then having a sharp outward turn 61, to move this cutter and slide backwardly and then terminating in a short circular arc 62 to cause the slides 49 to remain stationary during the proper period until they are again moved inwardly by the inclines 60. Thus similar operations are caused on each head while the cam ring turns through one eighth of a revolution. The worm wheel ring 57 is operated by means of a worm 61' on a transverse shaft 62' suitably geared to the main spindle 15 and this can conveniently be effected by the main spindle 15 having fixed on it a chain wheel 63 which by means of an endless chain 64 gears with a larger chain wheel 65 mounted to revolve on a shaft below the same, this chain wheel being geared as by bevel wheels 66, 67 to a cross counter shaft 68 arranged below the cam shaft 38 and driving the latter by a worm 69 on the counter shaft 68 gearing with a worm wheel 70 fixed on the cam shaft 38. The said cross counter shaft 68 is geared with the worm wheel 62 on the worm 61 which drives the worm wheel 57 by means of a chain wheel 71 fixed on the cross shaft 68 and gearing by endless chain 72 with the larger chain wheel 73 fixed on the worm shaft 62. Or it will be evident that any other suitable arrangement of gearing may be employed. The cam shaft 38 is furnished with one or more cams such for instance as 74 for actuating the slide 75 which is or may be provided and arranged in front of the head stock A to carry the tools for drilling, turning or otherwise operating on the fore ends of the rods protruding through the nose pieces 19 before said rods are cut off by the cutting tools. The said slide carrying these drilling, turning or other like tools can be of the usual construction as employed in other multiple spindle lathes according to the number of tools it is required to carry and the work to be done as will readily be understood.

As a modification, instead of the outer and inner tubes of the lathe spindles being operated as aforesaid through push rods sliding through the main spindle of the machine and actuated by cams at the front of the machine, these push rods and cams may if desired be dispensed with and the sliding plate and central sliding block for operating the inner and outer tubes of the gripping and feeding arrangement be operated by the sliding plate and central sliding block having two laterally projecting arms, one on each side of the machine and these furnished with rollers engaging with revolving cams on two cam shafts one at each side of the machine arranged in suitable bearings on the body of the machine and parallel with the main spindle from which latter the said cam shafts are driven the cams being shaped to give the proper sliding movements to the cross arms and sliding plate and central sliding block which actuate the inner and outer tubes of the feeding and gripping mechanism.

Figure 10:
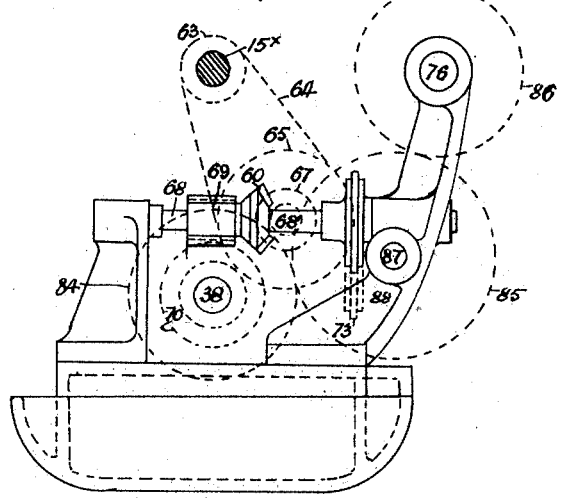
Fig. 10 is an end elevation of portions of the said machine.

This construction of my invention can conveniently be carried out as illustrated by Figs. 8, 9, and 10 where it will be seen that the tubular push bar 30 and the sliding push bar 45 are dispensed with and the main driving shaft is made as a solid shaft marked 15$^x$ adapted to revolve in the bushing 8 of the head stock and in the sleeve 29 of the same. Instead of the cam 37 at the front of the machine as in Figs. 1 and 2, two of these cams are employed at the back of the machine and marked respectively 78, 79, one of which namely, 78 is mounted on the cam shaft 38 the latter being carried through to the back of the head stock and the other said cam 79 is mounted on a second cam shaft 76 which is carried along the back of the machine to the back of the head stock and supported in suitable bearings as by the bracket 77 and a second bearing on the side of the head stock A not shown on my drawing. The central sliding block 28 which actuates the collars 27 on the lathe spindles is furnished with two laterally projecting arms 80, 81, one at each side of the vertical center line of the machine, these arms 80, 81, being furnished with pins carrying rollers 82 engaging with the cam grooves 93 of the cams 78, 79, which are arranged to impart the proper sliding movements to the sliding block 28. The circular plate 43 is similarly provided with two arms 83 only one of which can be seen in Fig. 8 and they are not shown in Fig. 9 as they are immediately behind the arms 80, 81. These arms 83 are similarly provided with pins carrying rollers working in the cam grooves 48 of the cams 78, 79, these grooves being shaped to impart the proper sliding movements to the circular plate 43 and the inner tubes 40 actuated thereby. The second cam shaft 76 can conveniently be driven from the first cam shaft 38 by the three spur wheels 84, 85, and 86 of which the wheels 84, and 86 are respectively fixed on the first cam shaft 38 and the second cam shaft 76 and the other wheel 85 is an idle wheel gearing with both and carried on a stud 87 on the bracket 88 which also forms the support for the cross counter shaft 68. In this modification of my invention the counter shaft 68 and its worm 69 are arranged above the worm wheel 70 on the cam shaft 38 as will be seen by Figs. 8 and 10.

On the back end of the bed plate 4 there may be fixed a stand 89 made with a circular part 90 in which are fixed eight guide tubes 91 corresponding in position with the lathe spindles 1 and forming guides for the tubes which are fed through the inner tubes 40.

The accompanying drawings illustrate what I consider to be the best way of carrying my invention into practice, but it will be understood that my invention is not limited to the particular arrangements shown as it will be evident these can be modified without departing from the nature of my invention.

What I claim as my invention and desire to secure by Letters Patent is:

1. In a multiple spindle lathe, the combination of a head stock, a plurality of work-carrying spindles mounted for rotation in said head stock, means for rotating said spindles and including a central shaft mounted for rotation in the head stock, a gear secured to said shaft within the head stock, and pinions carried by the spindles in mesh with said gear, a tool slide for each spindle mounted in radial guides in the front face of said head stock, a ring-like sectional cam mounted for rotation on said head stock in a plane parallel with the front face thereof, means for rotating said cam, and means carried by said tool slides for engaging said cam thereby to cause the slides to simultaneously move radially of the work spindles during the rotation of the cam.

2. In a multiple spindle lathe, the combination of a head stock, a plurality of work-carrying spindles mounted for rotation in said head stock, a tool slide for each spindle mounted in radial guides in the front face of said head stock, a worm wheel mounted for rotation on said head stock, a ring-like cam secured on said worm wheel for rotation in a plane parallel with the front face of the head stock, means for rotating said worm wheel, and means carried by said tool slides for engaging said cam thereby to cause the slides to simultaneously move radially of the work spindles during the rotation of the cam.

3. In a multiple spindle lathe, the combination of a head stock, a plurality of work-carrying spindles mounted for rotation in said head stock, a tool slide for each spindle mounted in radial guides in the front face of said head stock, a ring-like sectional cam mounted for rotation on said head stock in a plane parallel with the front face thereof, means for rotating the cam, means carried by said tool slides for engaging said cam thereby to cause the slide to simultaneously move radially of the work spindles during the rotation of the cam, and means for gripping and feeding the work through said spindles, said gripping and feeding means including a plurality of pivotally mounted work-engaging levers at the rear of the work-carrying spindles, and cam-operated slidable means passing through said head stock and adapted to shift said levers into and out of work-engaging position.

4. In a multiple spindle lathe, the combination of a head stock, a plurality of work-carrying spindles mounted for rotation in said head stock, means for rotating said spindles and including a central shaft mounted for rotation in the head stock, a gear secured to said shaft within the head stock, and pinions carried by the spindles in mesh with said gear, a tool slide for each spindle mounted in radial guides in the front face of said head stock, a worm wheel mounted for rotation on said head stock, a ring-like cam secured to said worm wheel for rotation in a plane parallel with the front face of the head stock, means for rotating said worm wheel, and means carried by said tool slides for engaging said cam thereby to cause the slides to simultaneously move radially of the work spindles during the rotation of the cam.

5. In a multiple spindle lathe, the combination of a head stock, a plurality of work-carrying spindles mounted for rotation in said head stock, a tool slide for each spindle mounted in radial guides in the front face of said head stock, a ring like sectional cam mounted for rotation on said head stock in a plane parallel with the front face thereof, means for rotating said cam, means carried by said tool slides for engaging said cam thereby to cause the slide to simultaneously move radially of the work spindles during the rotation of the cam, and means for gripping and feeding the work through said spindles, said gripping and feeding means including a plurality of work gripping members slidable in the work-carrying spindles, and blocks slidably journaled in the center of the head stock and adapted to be shifted by cam means to move said work gripping members.

6. In a multiple spindle lathe, the combination of a head stock, a plurality of work-carrying spindles mounted for rotation in said head stock, a tool slide for each spindle mounted in radial guides in the front face of said head stock, a worm wheel mounted for continuous rotation on said head stock, a ring-like cam secured to said worm wheel for continuous rotation in a plane parallel with the front face of the head stock, means for rotating said worm wheel, and means carried by said tool slides for engaging said cam thereby to cause the slides to simultaneously move radially of the work spindles during the rotation of the cam.

7. In a multiple spindle lathe, the combination set forth in claim 3, said gripping and feeding means including a plurality of pivotally mounted work-engaging levers at the rear of the work-carrying spindles, and cam operated slidable means passing through said head stock and adapted to shift said levers into and out of work-engaging position.

In testimony whereof I have signed my name to this specification.

WILLIAM GEORGE BERRY.